United States Patent [19]
Katz

[11] Patent Number: 5,835,576
[45] Date of Patent: Nov. 10, 1998

[54] TELEPHONIC-INTERFACE LOTTERY DEVICE

[75] Inventor: Ronald A. Katz, Los Angeles, Calif.

[73] Assignee: Ronald A. Katz Technology Licensing, L.P., Los Angeles, Calif.

[21] Appl. No.: 844,000

[22] Filed: Apr. 18, 1997

Related U.S. Application Data

[62] Division of Ser. No. 305,822, Sep. 13, 1994, which is a division of Ser. No. 756,956, Sep. 9, 1991, Pat. No. 5,365,575, which is a continuation-in-part of Ser. No. 555,111, Jul. 18, 1990, Pat. No. 5,048,075, which is a continuation of Ser. No. 342,506, Apr. 24, 1989, abandoned, which is a continuation of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.$^6$ .................................................. H04M 11/00
[52] U.S. Cl. .................... 379/93.13; 283/903; 379/93.26
[58] Field of Search .............................. 379/93.13, 93.12, 379/93.01, 93.14, 93.26, 246, 196, 201, 90.01, 88; 283/903, 79, 74, 100

[56] References Cited

U.S. PATENT DOCUMENTS

| | | | |
|---|---|---|---|
| 3,556,530 | 1/1971 | Barr et al. | 379/90.01 |
| 4,398,708 | 8/1983 | Goldman et al. | 283/903 |
| 4,922,522 | 5/1990 | Scanlon | 379/93.13 |
| 4,937,853 | 6/1990 | Brule et al. | 379/93.13 |
| 4,959,783 | 9/1990 | Scott et al. | 379/93.13 |
| 4,969,183 | 11/1990 | Reese | 379/93.13 |
| 4,996,705 | 2/1991 | Entenmann et al. | 379/93.13 |

*Primary Examiner*—Stella Woo
*Attorney, Agent, or Firm*—Lyon & Lyon LLP

[57] ABSTRACT

A telephonic-interface lottery system D interfaces with a multiplicity of individual terminals T1-Tn of a telephone network facility C to enable lottery players to call and play for at least one additional chance to possibly win by dialing a pay-to-dial telephone number indicated on a "scratch-off" or online game lottery ticket for use in the system. At the terminals, callers are prompted by voice-generated instructions to provide digital data, such as their telephone number, age, social security number, and/or drivers license number. In addition, the sequence number of the caller as well as the date and time of the call is recorded for positive association with a caller and is stored for processing. The caller's identification data is confirmed using various techniques and callers may be ranked and accounted for on the basis of entitlement and sequence. In accordance with one format, an instant winner is selected online by utilizing techniques such as determining a random winning sequence number or a winning lottery number generated by a number generator. As an adjunct or alternative, the identification data is processed at a later time to determine a grand prize drawing winner by using various processing techniques for determining winners.

14 Claims, 6 Drawing Sheets

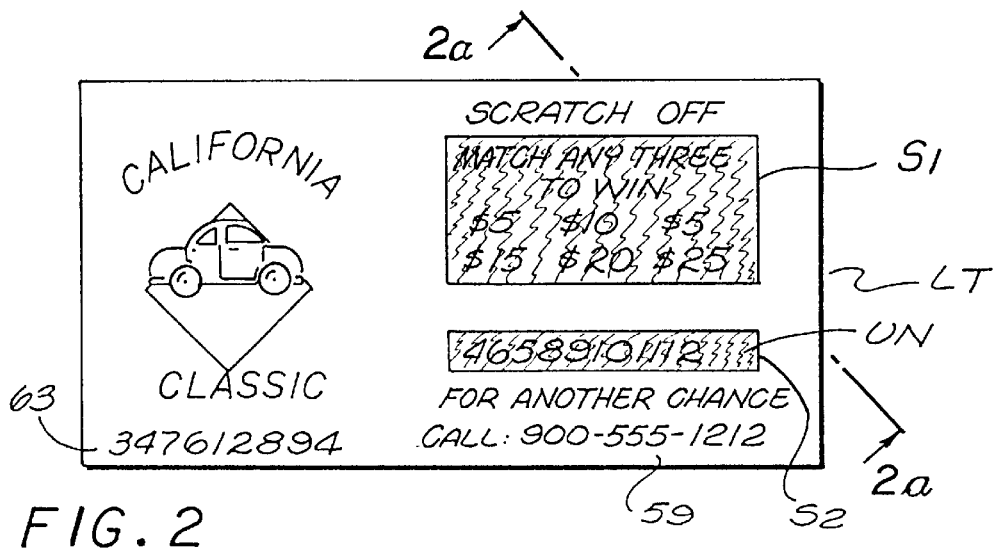
FIG. 2
FIG. 2a
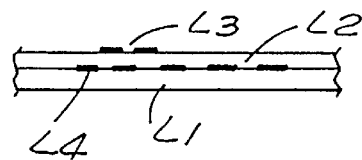
FIG. 5
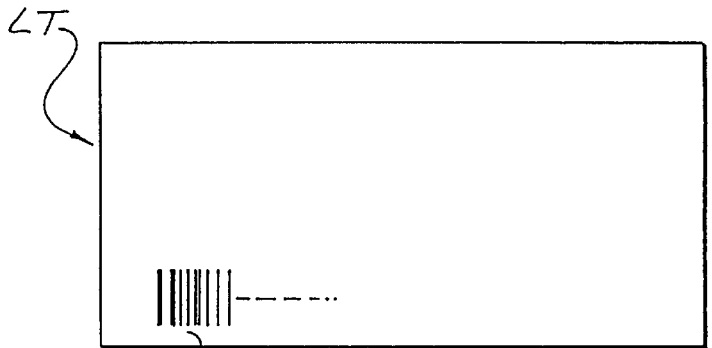
FIG. 7

TELEPHONIC-INTERFACE LOTTERY DEVICE

This is a divisional application of application Ser. No. 08/305,822 filed Sep. 13, 1994, and entitled "Telephonic-Interface Lottery Device", which is a divisional application of application Ser. No. 07/756,956 filed Sep. 9, 1991, and entitled "Telephonic-Interface Lottery System", now U.S. Pat. No. 5,365,575, which issued Nov. 15, 1994, which is a continuation-in-part of application Ser. No. 555,111 filed Jul. 18, 1990, and entitled "Telephonic-Interface Statistical Analysis System", now U.S. Pat. No. 5,048,075, which issued Sep. 10, 1991, which was a continuation of application Ser. No. 342,506 filed Apr. 24, 1989 and entitled "Telephonic-Interface Statistical-Analysis System", now abandoned, which was a continuation of application Ser. No. 194,258 filed May 16, 1988, now U.S. Pat. No. 4,845,739, which issued Jul. 4, 1989, which was a continuation-in-part of application Ser. No. 018,244 filed Feb. 24, 1987, and entitled "Statistical Analysis System For Use With Public Communication Facility", now U.S. Pat. No. 4,792,968, which issued on Dec. 20, 1988, which was a continuation-in-part of application Ser. No. 753,299 filed Jul. 10, 1985 and entitled "Statistical Analysis System For Use With Public Communication Facility", now abandoned.

BACKGROUND AND SUMMARY OF THE INVENTION

Various forms of publicly accessible communication systems for providing access to a central station have been proposed, some involving telecommunications. However, sometimes a need for ancillary functions arise in that regard, e.g. it may be desirable to positively identify a large group of persons, statistically analyze data from the group so as to accurately identify certain persons in the group and select a subset, or sub subsets of at least one person. In that regard, a need exists for an improved, effective, economical, and expedient system of telecommunication incorporating means for performing qualification, identification, analysis and selection of individual persons.

It has been proposed to interface persons at telephone calling stations directly with a computer facility. In accordance with such arrangements, recorded voice messages prompt callers to provide data by actuating the alphanumeric buttons that are conventionally employed for dialing from one telephone station to another. In one prior arrangement, a caller may actuate dialing buttons to selectively attain a communication channel or to address specific information in a computer. In another arrangement, dialing buttons may be actuated to specify an individual billing designation as for requested services. Generally, such systems are believed to have been somewhat limited in scope, often involving difficulties that are frustrating or confusing to a caller. Nevertheless, such techniques have been widely used to enhance and broaden communication.

The public lottery has become widely accepted as a basis for supporting government activities while providing aspects of entertainment and hope. Typically, conventional public lotteries have been facilitated by computers and data processing systems utilizing various formats. One conventional type of lottery incorporates the use of "scratch-off" lottery tickets that are sold by retailers. Under this system, winning tickets are returned to lottery retailers who redeem the tickets for the prize amounts, based on a physical approval of the lottery ticket.

In general, the present invention comprises a telephonic-interface lottery system and related process to further stimulate interest in the lottery by providing at least one additional chance to possibly win some prize (whether or not the scratch-off lottery ticket is a winner) by calling a pay-to-call number indicated on the scratch-off lottery ticket. The telephonic-interface lottery system. can also be utilized with online tickets in which case the online terminal printer can print at least one unique identification number (either the existing printed ticket or lotto number or a new special number which may be interrelated to the existing ticket number) for subsequent telephone use. In one embodiment, scratch-off lottery tickets for use in the telephonic-interface lottery system include primary indicia defining a lottery format to evidence a winning lottery combination and at least one unique identification number used to pursue the additional chances. The lottery format and at least a portion of the identification number are concealed. The telephone number facilitating a play of the additional chance is a pay-to-call number, such as preferably a 900 phone number.

The telephonic-interface lottery system utilizes both analog (voice) and digital telephonic communication in a variety of different interface formats or programs, to record data relating to each caller, in particular data formulated by the lottery system such as the sequence number of the call including the date and time at which the call occurred, data provided by the caller such as the area code and telephone number followed by the unique identification number or additional chance number from the lottery ticket. The system is configured to eliminate duplicate entries and verify the unique identification number. Instant winners can be selected while the lottery player is on the telephone by a designated winning sequence number or by a random number generator. In addition, winners can also be selected at a later designated time by a designated winning sequence number or by the random number generator.

BRIEF DESCRIPTION OF THE DRAWINGS

In the drawings, which constitute a part of this specification, exemplary embodiments exhibiting various objectives and features hereof are set forth, specifically:

FIG. 2 is a top plan view of a scratch-off lottery ticket for use in the system of FIG. 1;

FIG. 2a is a cross sectional view taken along line 2a—2a in FIG. 2;

FIG. 5 is a bottom plan view of the scratch-off lottery ticket shown in FIG. 2;

FIG. 7 is a fragmentary diagrammatic representation of a storage cell format as may be developed in the system of FIG. 4.

DESCRIPTION OF THE ILLUSTRATIVE EMBODIMENTS

As required, detailed illustrative embodiments of the present invention are disclosed herein. However, physical communication systems, data formats, and operating structures in accordance with the present invention may be embodied in a wide variety of forms, some of which may be quite different from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
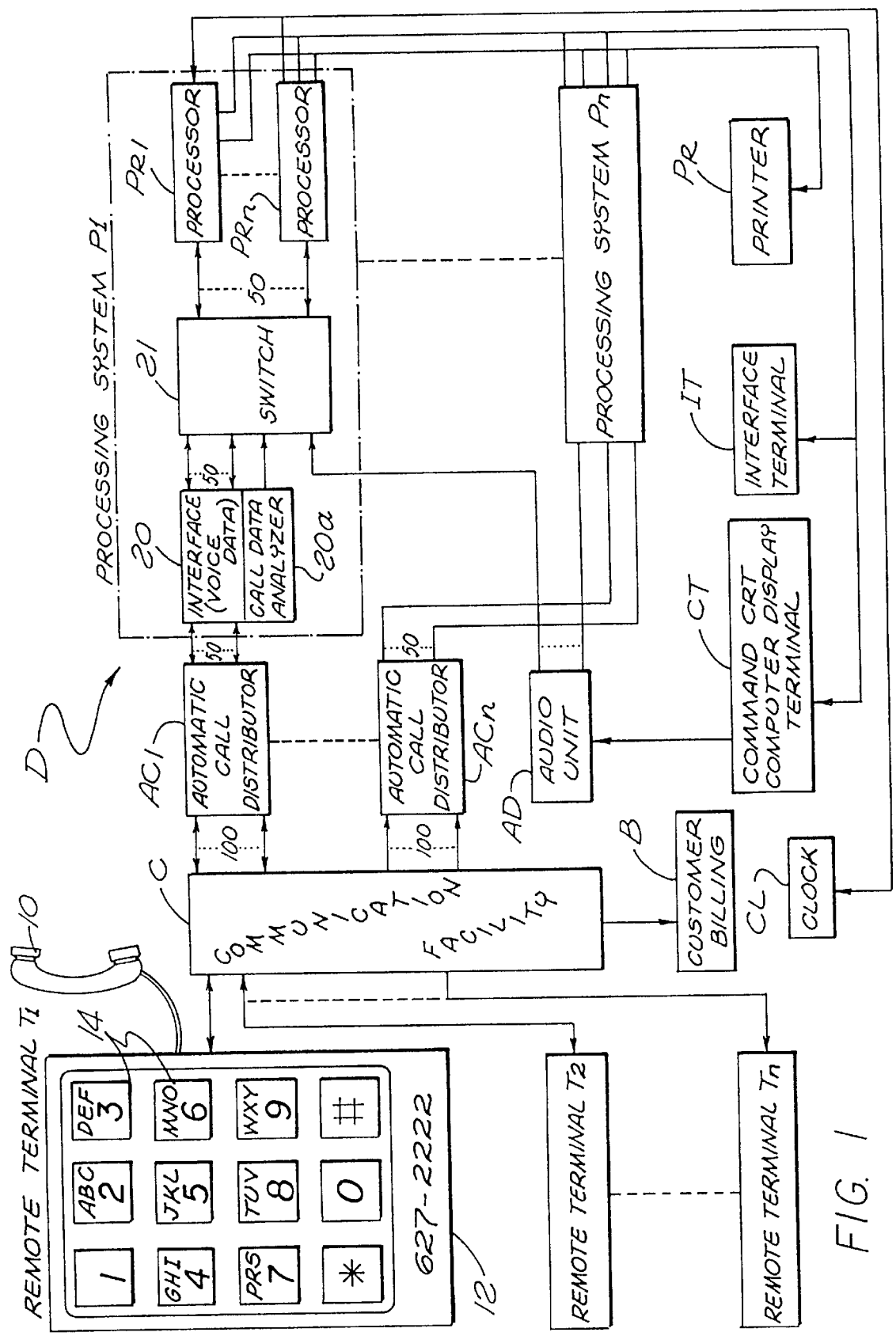
FIG. 1 is a block diagram of a telephonic-interface lottery system constructed in accordance with the present invention.

Referring initially to FIG. 1, a series of remote telephone-instrument terminals T1 through Tn are represented (left). The terminals are generally similar, and accordingly, only the terminal T1 is illustrated in detail.

In the disclosed embodiment, the remote terminals T1 through Tn represent the multitude of conventional telephone terminals that are coupled to a communication facility C which may take the form of a comprehensive public telephone system for interconnecting any associated terminals T1–Tn. In accordance with the present system, the terminals T1–Tn operate through the communication facility C to be coupled with a central station D, an embodiment of which is illustrated in some detail.

Generally in accordance with the present development, individual callers use the individual telephone stations T1 through Tn to interface the station D through the communication facility C. Callers may be screened or qualified. Also in accordance herewith, the data of individual callers including digital data provided by callers may be collected, correlated and tested in the station D for processing in accordance with various programs and external data. As a consequence, various objectives are accomplished. For example, a select subset of the callers may be isolated and specifically identified, or related data may be processed, or transactions may be actuated. The possibilities for application of the system are substantial and varied as will be apparent from the exemplary structure and functions as described in detail below.

In one operating process format, legal lotteries are enabled that are interesting, effective and very economical on an individual participant basis. The telephonic-interface lottery system of the present invention further stimulates interest in the lottery by providing at least one additional chance to possibly win a prize in addition to a winning lottery format provided on a scratch-off lottery ticket or an online ticket. The additional chance is facilitated by calling a pay-to-call number indicated on the scratch-off lottery ticket. Some formats may use toll free 800 numbers as well.

The callers may be variously qualified on the basis of entitlement and may be identified for subsequent verification. The callers may be prompted, either through the interface or externally, to provide appropriate data, such as their age and the additional chance number which may be one or more unique identification numbers.

Considering the system of FIG. 1 in somewhat greater detail, it is to be understood that the communication facility C has multiplexing capability for individually coupling the terminals T1–Tn to the central station D on request. In the illustrative embodiment of the system, the communication facility C comprises a public telephone network and the individual terminals T1–Tn take the various forms of existing traditional or conventional telephone instruments.

The exemplary telephone terminal T1 is represented in some detail to include a hand piece 10 (microphone and earphone) and a panel 12 provided with a rectangular array of push buttons 14 in the conventional configuration. Of course, the hand piece 10 accommodates analog signals while the panel 12 is a digital apparatus. Generally in accordance herewith, the hand piece 10 serves to manifest analog signals vocally to the caller.

In accordance with conventional telephone practice, alphabetic and numeric designations are provided on the buttons 14. For example, several of the buttons 14 carry three letters along with a decimal digit. Specifically, the button designated with the numeral "2" also carries the letters "A", "B" and "C". In that manner, the buttons 14 encompass the numerals "0–9", two symbols, and the alphabet except for the letters "Q" and "Z". Consequently, the buttons 14 accommodate the entry of decimal data, and to some extent alphabetic data.

The buttons 14 designated with symbols "*" and "#", along with the numeral "0", can be used by predetermined assignment to represent the letters "Q" and "Z" or any of a variety of other data or command components. Generally, in accordance-herewith, the buttons 14 are employed to formulate digital data at the central station D in various formats determined by the instant specific use and operating format of the system.

Considering the central station D in somewhat greater detail, the communication facility C is coupled to interface a series of processing systems P1 through Pn (FIG. 1, right). Specifically, the communication facility C is connected to the processing systems P1–Pn through an associated series of automatic call distributors AC1 through ACn. Each of the automatic call distributors AC1–ACn accommodates one hundred lines from the communication facility C and accordingly, may accommodate and queue up to 100 calls.

Each of the automatic call distributors AC1–ACn may take various forms as well know in the prior art, functioning to queue incoming calls for connection to a lesser number of lines. Also, in various systems audio response units (ARU's) may be used as for preliminary processing in accordance with the operations as described below.

In the disclosed embodiment, from each of the call distributors AC1–ACn, fifty lines are connected respectively to the individual data processing systems P1–Pn through an interface 20 and a switch 21. Thus, in the disclosed embodiment, each of the automatic call distributors AC1–ACn can accommodate one hundred lines, fifty of which may be active in association with one of the processing systems P.

The processing systems P1–Pn are similar, therefore, only the processing system P1 is shown in any detail. Collectively, the processing systems P1–Pn are interconnected with a command computer terminal CT, at least one interface terminal IT, at least one printer PR and an audio unit AD. The command terminal CT is separately coupled to the audio unit AD.

As represented, the processing systems P1 through Pn each contain a number of individual function units or processors PR1 through PRn. Although various other configurations and arrangements may be employed, the explanation is facilitated by including a plurality of individual function units as treated in detail below.

Considering the processing system P1, fifty lines from the automatic call distributor AC1 are connected to the interface 20, an exemplary form of which may be a commercially available Centrum 9000 unit. The interface 20 incorporates modems, tone decoders, switching mechanisms, DNIS and ANI capability (call data analyzer 20a) along with voice interface capability. Note that the interface may actually perform analysis on data. However, to preserve the disclosed embodiment manageable, major analysis is explained with reference to processors.

Generally, DNIS capability is a function of the communication facility C (composite telephone system) to provide called terminal digital data indicating the called number. ANI capability is a similar function whereby the digital data indicates the calling number with calling terminal digital signals. Both capabilities are available for use with equipment as the interface 20 and to provide control through the call data analyzer 20a.

Accommodating up to fifty independent calls on separate communication paths to the central station D, the interface 20 is capable of providing analog (voice) signals to prompt each caller. Also accommodated are digital signals including the DNIS and ANI signals. The system contemplates the possibility of utilizing sequences of lines in rotary as well as blocking sequences of lines, the numbers for which command a particular program or operation format of a function unit as disclosed in detail below.

The interface 20 provides the connection of the fifty lines to a switch 21 which is in turn coupled to fifty function units, or processors PR1–PRn. As indicated above, multiple function units, or processors, are described in the disclosed embodiment to facilitate the explanation. Of course, non-parallel techniques and multiplexed operations might well be employed as alternatives. For a similar reason, as disclosed herein, each of the processors PR1–PRn includes memory cells for each of the callers' individual data. Development and compilation of data in such cells according to various operating formats is described below. In the disclosed embodiment, the processors PR1–PRn are connected collectively to the command computer terminal CT (incorporating a CRT display), the interface terminal IT, and the printer PR. Note that the CRT display serves to visually display data regarding select subsets as explained in detail below.

Exemplary detailed structures for the processors PR1–PRn are described below; however, in general, the units may comprise a microcomputer, for example, programmed as suggested above and as disclosed in detail below to accomplish specific operating formats. As an integral part of such formats, a caller may be qualified as belonging to an entitled set of persons, such as persons holding a proper lottery ticket and being over a certain age. Also, callers may be designated both with respect to their significance and their identification. For example, callers may have different significance in a format, depending on the time or sequence of their call. Also, the designation of a caller may be exceedingly important in relation to the caller eventually being isolated as part of a subset or sub subsets, the members of whom must be accurately verified.

As described below, in a lottery format the designations may involve multiple elements which may include: random number assignments, encryption techniques, utilization of calling numbers, identification data, sequence of call and so on to facilitate reliable verification. Note that the communication facility C has a customer billing, structure B that is interfaced by the system.

On the qualification and designation of callers, the system enters a data receiving phase during which digital data (formatted at one of the telephone terminals T1–Tn by the caller) is processed by one of the processors PR1–PRn. In general, the processing evolves a subset (at least one caller) and also possibly a sub subset, the members of which may be verified and confirmed.

Either during the data accumulation phase, or after the processing phase to isolate a subset, a distinct operation may involve actuating the interface terminal T1 for direct communication between the caller and an operator at the terminal T1. Another distinct operation may involve actuation of the printer PR to provide documents in relation to the operating format, as for providing award certificates as for verifying members of an isolated subset. Also, charge slips may be generated containing at least part of the data of a particular transaction.

Figure 3:
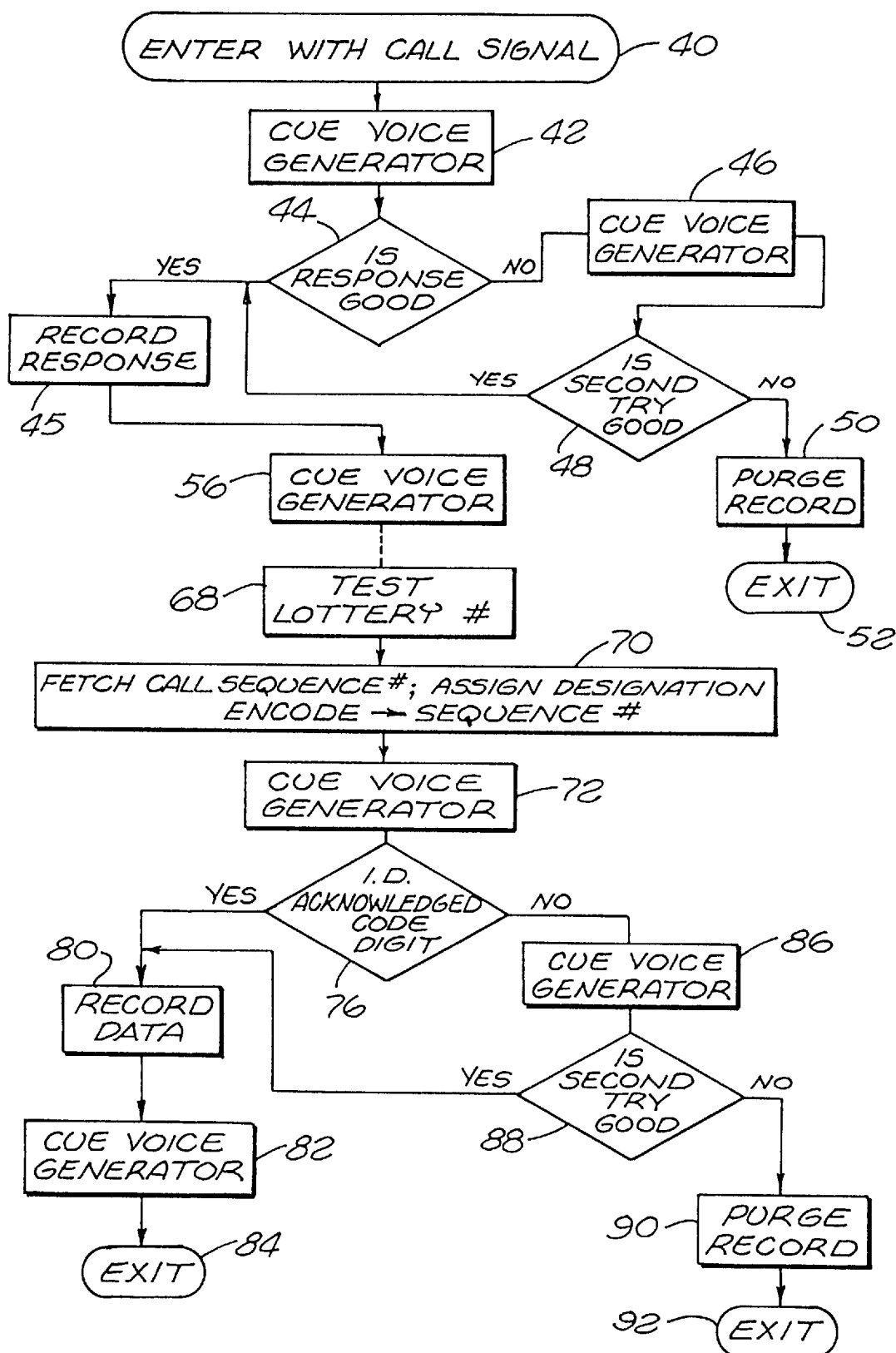
FIG. 3 is a flow diagram of one operating format of the system of FIG. 1.

A general sequence of operations for a format is represented to be initiated in FIG. 3 by the "enter" block 40 which is accordingly followed by a "cue voice generator" command block 42. If the ANI (automatic number identification) equipment is not employed, the voice generator in the interface 20 formulates speech, a representative form of which might be: "Thank you for participating in the lottery. Please give us your telephone number by actuating the call buttons on your telephone instrument."

Acting on the instructions, the caller would push the buttons 14 in sequence to indicate his telephone number, e.g. "(213) 627-2222". Alternatively, the interface 20 can accept the calling number ((213) 627-2222) according to its provision by standard ANI equipment of the communication facility C.

The resulting data signals are communicated from the interface unit 20 (FIG. 1) to the processor PR1 for testing the telephone number as valid or entitled. Essentially, the format of a proper number prompts production of a valid or "good" signal. The test is indicated by the block 44 (FIG. 3). If the response is not valid or entitled, for example contains an inappropriate number of digits or has been used to a point of excess, the operation of block 46 is initiated again cuing the voice generator 30 (FIG. 1). The voice generator accordingly instructs the caller, e.g.: "You have not entered a proper telephone number. Please reenter your telephone number by pressing the appropriate call buttons." The caller is then allotted a predetermined period of time to make a proper entry with the consequence that the system moves to a test operation as indicated by the block 48 (FIG. 3). Specifically, block 48 poses the query: "Is the second try good?"

If the caller is again unsuccessful, the system purges the record as indicated by the block 50 and the call is terminated as indicated by the block 52. In an alternative mode, the processor PR1 may abort the interface and couple the interface terminal IT for direct personal communication with the caller. The interchange would then proceed, person-to-person.

If the caller responds with a proper telephone number, the operation proceeds. Specifically, the system sequences to record the response of the proper telephone number as indicated by the block 45. That is, the caller's telephone number is recorded in an assigned specific memory cell identified with the caller. The format of the cell C1 is indicated in FIG. 7 showing the individual fields or sections. The first portion, section 53, contains a form of identification data, i.e., the caller's telephone number, i.e. "(213) 627-2222".

Note that as explained above, if the second attempt to formulate a proper number is successful, as manifest by the block 48 (FIG. 3), the response is recorded at that stage. In either case, exiting from the block 45 (FIG. 3) invokes the next operation of again queuing the voice generator as indicated by the block 56.

At this juncture, the system proceeds to receive and process the lottery ticket data as well as other data such as the identification data provided by the caller and the data formulated by the computer. The result is a subset of winners, or perhaps ultimately several subsets or sub subsets of winners or potential winners. However, first the lottery ticket number (such as the unique identification number) is entered by the caller as indicated by the block 68. The lottery number may be stored in section 66 (FIG. 7) of cell C1.

At the outset, the system may test the lottery ticket number on the basis of its format. That is the number is verifiable (as by digit combinations, for example the first two digits may equal the third) and is tested as explained above in relation to the telephone number. If a received number is invalid, the call may be terminated as explained above. Any record may be purged.

If the number is valid, it is next tested as a winner. Essentially, the number is treated as a consumable key, entitled for example to a single use for participation. The participation may include an online subset determination of winners and a subsequent offline determination of another subset of winners. These tests are indicated by the block 68. From that point, as illustrated by the block 70, data is accumulated for subsequent offline processing.

The detailed operation is not represented in FIG. 3 as it is similar to the operation illustrated by the blocks 42 through 56. However, again, a proper response is registered in the storage cell C1 as illustrated in FIG. 7 by the number "58".

During the course of the telephonic communication, the processor PR1 formulates identification data for the caller specifically such as: the date and time of the call, the chronological sequence of the call, the assigned designation of the call, and a set of acknowledgment digits for the call. Such data identification is registered in the caller's assigned cell C1 in accordance with the format of FIG. 2 being stored in sections 62, 64, 67 and 69. Note that the data may be stored in a coded interrelationship. For example, the acknowledgment digits may be related to the call record sequence. In the illustrative example, the chronological order number of the caller is 4951. The acknowledge digits may be derived from the sequence number. For example, as illustrated, a coded relationship may be established by adding "two" to each of the individual record sequence digits. Considering the example numerically:

Adding without propagated carries:

$$\begin{array}{r} 4951 \\ \underline{2222} \\ 6173 \end{array}$$

Note that the confirmation data as acknowledgement digits can be extremely important, as to communicate with an isolated member of a subset. For example, identification of an ultimate winner could be published or circulated, as by a television broadcast, then respondents checked by use of confirmation data that may be confidential.

Continuing with the above example, the call chronological sequence registered for the caller is 4951 as represented in the section 62 while the acknowledge digits are 6173 as registered in the section 66. Additionally, the processor PR1 develops an assigned designation number, e.g. designation "4951684", which is registered in the section 67, the acknowledge code or digits, e.g. 6173, being registered in the section 69. These values are formulated in accordance with conventional number techniques during the data acquisition phase. With the exemplary numerals formulated, the operation proceeds.

In the detailed operation, in addition to entering data from the remote terminal, the processor PR1 (FIG. 1) cues the internal memory as indicated by the block 70 (FIG. 3). Thus, the processor PR1 fetches the call record sequence number, assigns a designation (if not previously assigned, in some cases the sequence number is the designated number), and encodes the sequence number as the acknowledgment digits (if not previously accomplished).

To confirm receipt of the acknowledgement digits, the processor PR1 (FIG. 1) cues the voice generator in the interface 20, as indicated by the block 72 (FIG. 3) to provide information to the caller. Specifically, for example, the voice generator in the interface 20 (FIG. 1) might signal: "This transaction has been designated by the number 4951684, and is further identified by the acknowledgment digits 6173. Please make a record of these numbers as they will be repeated. Specifically, the designation number is 4951684. The acknowledgment digits are 6173. Please acknowledge this transaction by pressing your telephone buttons to indicate the acknowledge digits 6173." In lottery applications typically involving security, the order and acknowledgment of callers may be very important. Therefore, data for confirmation associated with the order is important.

The system next proceeds to the test mode as indicated by the block 76 (FIG. 3). If the caller provides the correct acknowledgment digits, the data is confirmed in the record as indicated by the block 80 and is registered in the cell C1 (FIG. 2). Additionally, the voice generator is sequenced as indicated by the block 82 (FIG. 3) to indicate the close of the communication and that the transaction is terminated as represented by the exit block 84.

In the event that a caller cannot confirm his acknowledgment digits, as indicated by the block 76, a repeat operation is performed as indicated respectively by the blocks 86 and 88. Specifically, the voice generator is queued for a second instructional message. In the event that the second attempt also fails, the data is purged and the call discounted as indicated by block 90 and an exit block 92. If the second try is successful (test block 88), as indicated by the block 80, the record is perfected as indicated above.

As a result of the likelihood of a large number of calls, as described above, data cells in the processors PR1–PRn (FIG. 1) are developed with specific information relating to each call. Such data, accumulated from the various calls may be considered by logic comparisons in the computer 22 to select the subset of winning persons who should be isolated at a later point.

The processing operation usually involves comparison testing which compares caller data from individual memory cells of the processors P1–Pn (FIG. 1) with test data, such as a look-up table, that is supplied through the command terminal CT.

Figure 4:
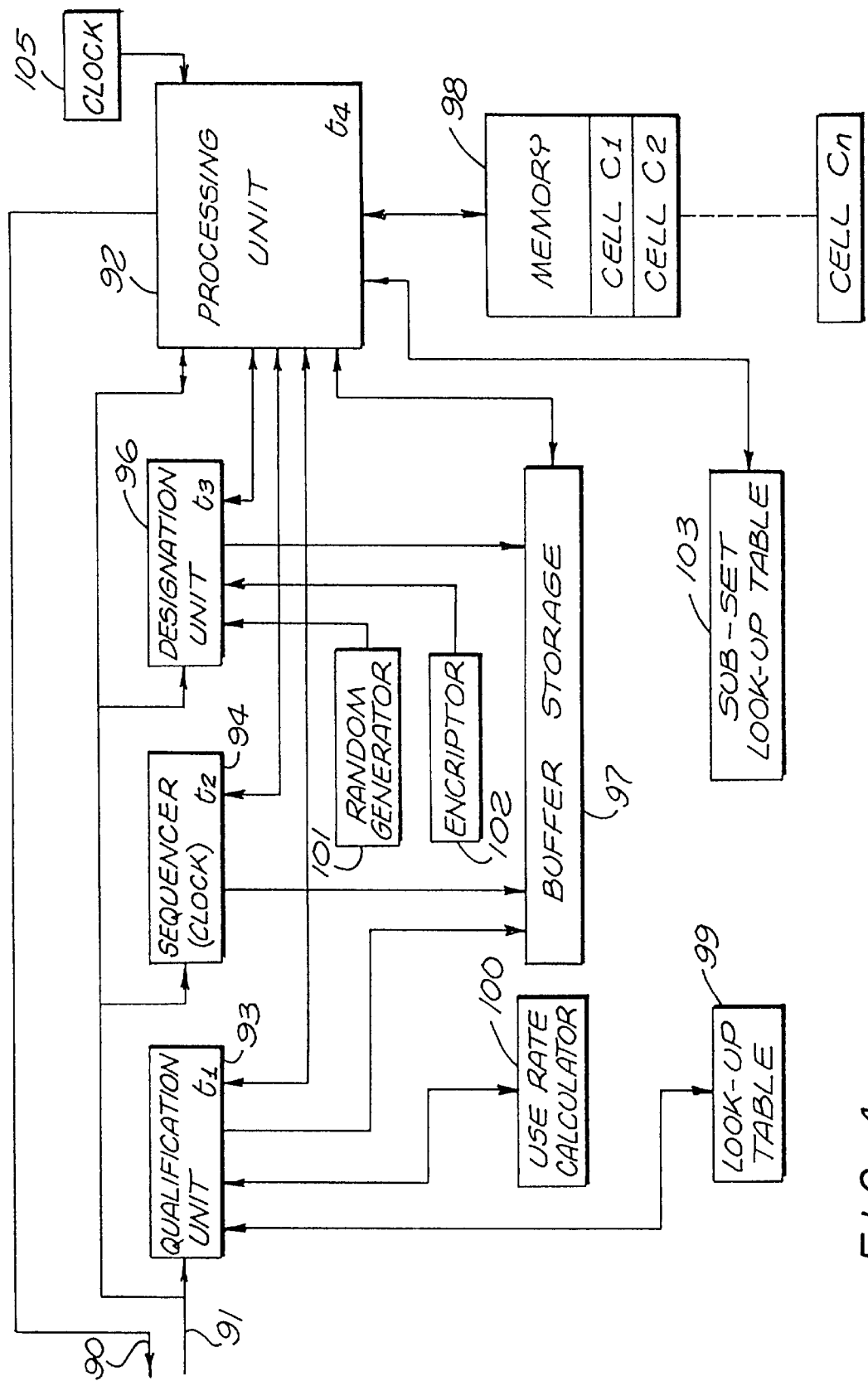
FIG. 4 is a block diagram of a form of processor or function unit as may be employed in the system of FIG. 1.

Preliminary to considering an exemplary form of the telephonic-interface lottery system of the present invention, reference will now be made to FIG. 4 showing an exemplary structural form for the processors PR1–PRn. From the switch 21 (FIG. 1) a pair of communication lines 90 and 91 are indicated in FIG. 4 (top left). The line 90 provides signals from a processing unit 92 while the line 91 provides signals to the processing unit 92 along with other components as represented in FIG. 4. The separate lines 90 and 92 facilitate explanation.

The processing unit 92 may take the form of a minicomputer programmed to accommodate the functions of various applications, as disclosed in detail below. As indicated above, the system may utilize a plurality of independent function units or processing units, e.g., processing unit 92, operating in a somewhat parallel configuration, or alternatively, a limited number of processors may be driven sequentially to accommodate the functional operations as described.

The input line 91 (upper left) is connected specifically to a qualification unit 93, a sequencer 94 and a designation unit 96, as well as the processing unit 92 as indicated above. The qualification unit qualifies access from a remote terminal T1–Tn to the processing unit 92 as described in detail below. In accordance with various applications or operating formats, the qualification unit 93, the sequencer 94 and the designation unit 96 operate preliminarily with respect to individual callers. Generally, these units qualify or test callers for entitlement to participate in the lottery, develop a sequence-of-calls record and provide forms of designations for callers that may be authenticated. As described in detail below, the units function in sequence to accomplish such operations and accordingly are each individually connected to the processing unit 92 and a buffer storage 97. Essentially, the buffer storage 97 is illustrated separately from the processing unit 92 along with the unit 93, sequencer 94, unit 96, and so on, again in order to facilitate the explanation. Similarly illustrated are a memory 98 (with cells C1–Cn), a look-up table 103 and a clock 105.

Considering the processor of FIG. 4 in further detail, the qualification unit 93 (upper left) is connected to a look-up table 99 and a use-rate calculator 100. The designation unit 96 (top center) is connected to a random number generator 101 and an encryptor 102.

In view of the above structural description of the system, consideration will now be given to a certain specific application in relation to the operation of the system.

As the illustrative operating format, an embodiment of the telephonic-interface lottery system will now be described. The legalized state lottery typically features various "scratch-off" ticket lottery game formats such as "the California Classic", "Treasure Hunt", "Blackjack", "Lucky 7's" and the like. In addition, lotteries typically offer online games such as Lotto. The enhanced lottery system accommodated by the present telephone system may utilize pay-to-dial numbers ("900-xxxx") or toll free 800 numbers and may be restricted to a limited number of uses for defined intervals of time. For example, a person might be entitled to play the lottery only a limited number of times or to the extent of a limited dollar value during a predetermined interval.

Certain digits of the unique identification number may Crontain information on a particular format, for example the "California Classic". Multiple formats may run simultaneously and the DNIS for example may indicate the lottery format and processing for each game. Additionally digits in the unique number when entered by the caller might indicate a telephone subformat.

Referring now to FIG. 2, a lottery participant upon purchasing a "scratch-off" lottery ticket LT for use in the system D has at least two chances to win. The first chance is facilitated by a lottery format defining a winning combination, for example by matching three like dollar amounts or symbols from a plurality provided in a first section S1. Subsequent chances are provided by telephone communication in accordance herewith. Preliminarily, consider the specific structure of a ticket in accordance herewith.

The lottery ticket LT is made from any suitable base substrate typically used and is likewise suitably sized to accommodate all the information. A scratch-off layer covers part or all of the ticket. Structurally, the ticket LT is a composite including a base substrate L1 (FIG. 2a) bearing a latex scratch-off layer L2. Visible print or indicia L3 appears on the latex layer L2 which may be integral or over stamped. Concealed indicia L4 is fixed on the substrate L1 and is revealed when the latex layer is removed. As illustrated in FIG. 2, the concealing areas S1 and S2 of the latex layer L2 are illustrated by wavy lines, accordingly normally concealed indicia is revealed.

As illustrated in FIG. 2, the upper section S1 of the scratch-off latex layer L2 defines ticket-specified winners. That is, as indicated above, matching combinations or symbols define winners. The lower scratch-off section S2 of the ticket LT indicates a unique identification number UN which may be several digits. The first section S1 and at least a portion of the identification number UN is covered with a suitable substance, such as latex in order to conceal the lottery format and the complete identification number from the lottery participants, retailers and the like and prevent any fraudulent activity. The unique identification number may also be the stock number (sequence number assigned by the lottery for each ticket to keep track thereof) of the lottery ticket with additional concealed or latex protected digits.

The lottery ticket LT also indicates the pay-to-dial telephone number indicia 59 to facilitate additional chances to win. For example, the lottery ticket LT bears indicia 61 indicating "For Another Chance call 900-555-1212". Accordingly, regardless of whether the lottery ticket LT defines a winning combination, the lottery participant has another chance to possibly win by dialing the pay-to-dial number and incurring a further minimal cost, for example 50 cents. In some formats all players including winners of the matching combinations are provided with an additional opportunity to win. Note that the ticket LT also carries another number as indicated by the unconcealed indicia 63.

The lottery ticket LT on its reverse side is provided with a bar code BC defining a number corresponding to the unique identification number UN which would allow the retailer or the lottery system to verify instant winners when the lottery tickets are redeemed and automatically cancel related information on the data stored in the memory.

Pursuing the operation of the system in greater detail, using the specified calling number (900 555 1212) from the terminal T1 (FIG. 1) the caller would actuate the push buttons 14 to establish contact with the processing system P1. Communication would be through the communication facility C, the automatic call distributor AC1, the interface 20 and the switch 21 as described in detail above.

The initial operation involves qualification of the caller to participate in the lottery. Again, ANI or caller interface techniques may be employed as described above. If the caller is involved, the interface 20 is actuated by the qualification unit 93 during the operating interval t1 to instruct the caller: "Please key in your telephone calling number". As indicated above, an alternative involves the system simply registering the calling number on the basis of its provision by ANI equipment. As indicated above, in one sequence the callers telephone number is tested at this point. Also, the lottery number also may be tested at this stage or subsequently. Various sequences are practical, another of which involves data accumulation prior to winner tests.

After the caller's telephone number is registered, the instruction is given: "Participation in the lottery is for persons over twenty-one years of age. Accordingly, please key in the year of your birth". A birth date, social security number, driver's license or credit card number may be similarly registered to confirm age or confirm identification of caller. Alternatively, the combination of telephone number and date or year of birth or age could be used. In any event, the caller's data is registered and the qualification unit 93 then functions to test the data as provided. Specifically, the caller's telephone number is checked in a look-up table 99 to determine whether or not it is a proper and currently valid number for use in the lottery.

If the data indicates a qualified caller, the system proceeds to the next phase of designating the transaction. The designation unit 96 operates during the interval t3 to provide the caller with a designation for the current transaction which may be the sequence number. As explained above, the random generator 101 with or without the encryptor 102 may be employed to create an identification number which may include an encrypted form of the caller's telephone number. Accordingly, data for the transaction is established in the buffer 97 then set in a cell of the memory 98 (FIG. 4). Specifically, the completed data cell format might be as follows: Telephone No.-Birth Year-Designation-Random No. In the format being described, the system next functions to generate the random number as indicated above which will then be tested against a series of other numbers to determine whether or not the caller is a winner. In that regard, elements in the processing unit 92 which accomplish the operation are illustrated in FIG. 6 which will now be considered in detail.

Typically, a caller will have scratched off the latex layer L2 over the section S2 prior to placing a call to the lottery interface system. Depending on the operating sequence employed, at some point, the caller is cued to input the number carried by the indicia UN. Specifically, the number is simply entered using the terminal touch tone keypad. As a result winners can be selected with online processing while the caller is on the phone as well as by off-line processing at a later designated time. Both online and off-line winners can be selected by determining a winning sequence number or by selecting a random lottery number or selecting a random sequence number.

A random number generator 160 functions on command to provide a three-digit number. With the consummation of a call, the random number generator 160 is actuated to provide the caller's random number in a selected caller cell 162. From that location, the caller's random number is compared with numbers from a register 164 by a comparator 166. The numbers in the register 164 were previously passed through a gate 174 from the generator 160. In the event of coincidence, the comparator provides an output "yes" signal to a line 168. Conversely, the failure of coincidence prompts the comparator 166 to provide a "no" output to a line 170. Essentially, a "yes" indicates a win while a "no" indicates the caller has lost.

Figure 6:
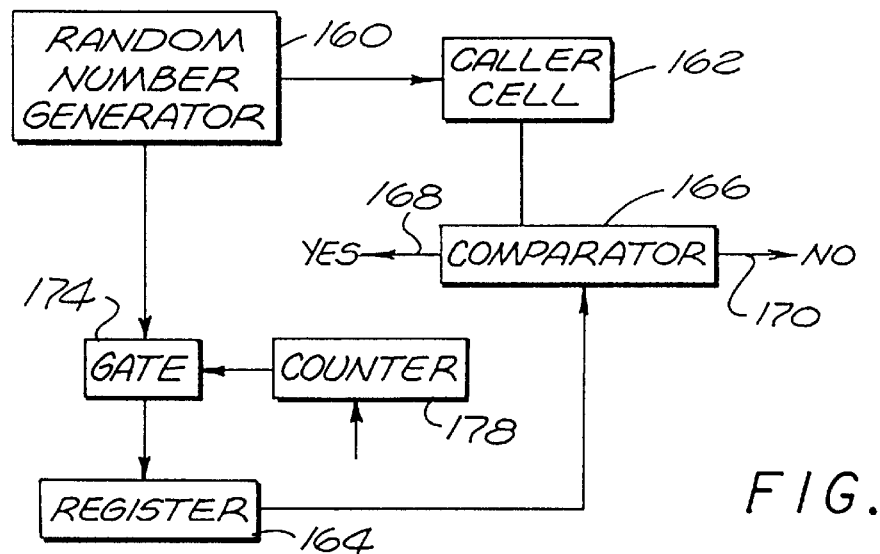
FIG. 6 is a block diagram of elements in an operating function unit of FIG. 4.
Figure 8:
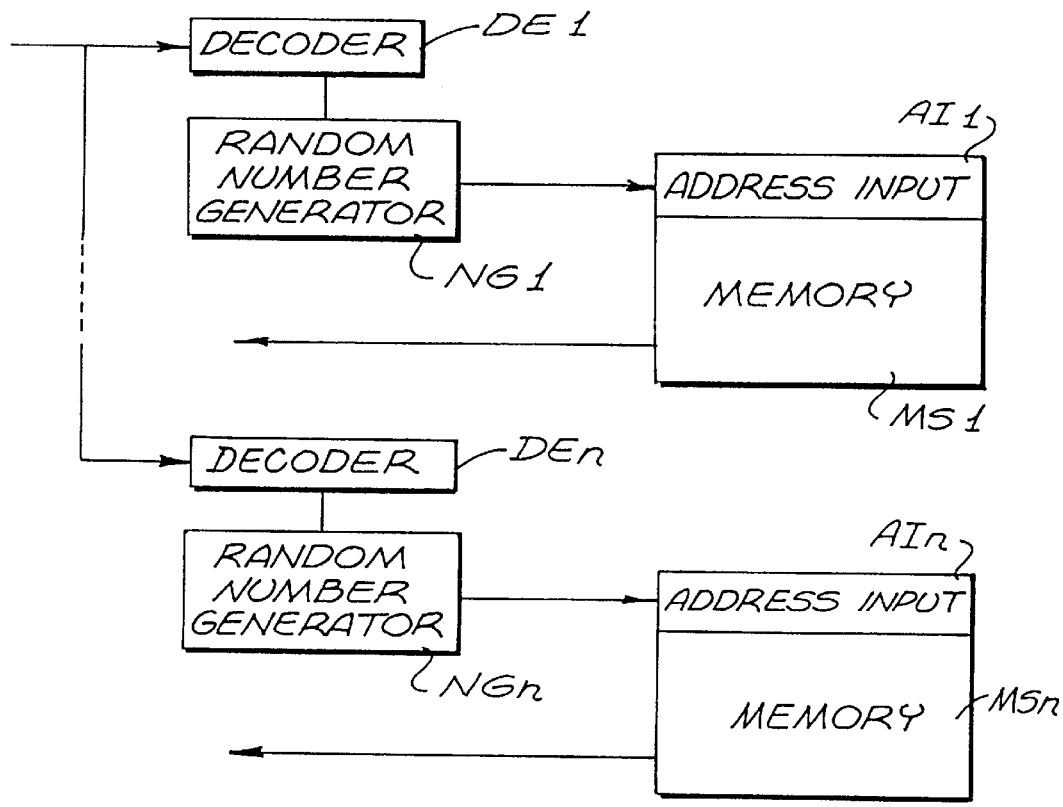
FIG. 8 is a block diagram of elements in an operating function unit of FIG. 4.

The elements of FIG. 6 provide a random operating format to determine winners on a somewhat statistical basis; however, the system increases the probability with the passage of time when no win occurs. In that regard, at the outset of an operating cycle, the random number generator 160 provides a random number that is passed through the gate 174 to the register 164. In the exemplary format, a three-digit number would be provided. At that stage, the caller's random number, from the cell 162, would be compared with the single number in the register 164 by the comparator 166. However, with the passage of time, calls are tallied or time is metered by a counter 178. Accordingly, upon the attainment of a predetermined count, the gate 174 is again qualified to enter another number in the register 164. Accordingly, an increasing set of numbers are held in the register 164 for comparison with each caller's number. Of course, the more numbers in the register 164, the higher probability of a caller winning and that relationship depends upon the duration or number of calls since the last winner.

Either a win or a loss as indicated within the processing unit 92 (FIG. 4) prompts the interface 20 to respond appropriately to the caller announcing his results. If there is a win, the designation may be reinforced and additional identification may be taken as explained above. Of course, if the prize simply involves a credit on the caller's telephone bill or his credit account, identification and designation become less critical considerations.

In the event of awards to be claimed, the processing system P1 (FIG. 1) may actuate the printer PR to produce a positive identification of the winner, which document may be redeemed only by the caller providing the assigned designation along with confirmation of his identification data.

Generally in relation to awards, the processing unit 92 may also utilize a random number format for determining the significance of awards. That is, a random number may be actuated to provide numerals from one through twenty, for example, the magnitude of the number generated for a caller indicating the significance of his award. Normally such information would be provided to the caller and registered in his memory cell.

With respect to memory cells generally, it is to be noted that actuated memory cells may be cleared for callers who are not winners. Accordingly, a limited number of memory cells store the subset of winners for subsequent confirmation processing and so on. Alternatively, historical data cells for each caller may be maintained.

As explained above, clearances may be perfected through the look-up table 99 (FIG. 4) in association with the qualification unit 93 or approvals through a consumable key step may be extended to incorporate functions of the processing unit 92 in association with the memory 98. For example, if qualification simply involves a check-off operation, the look-up table 99 will normally be employed.

As explained above, the arrangement of the function unit (or units) may be variously embodied in a single processor or many processors, depending on various considerations as time sharing, multiplexing, paralleling and so on. The systems as described above embody the components bulked together in one location. However, components of the system could be spaced apart geographically, using dedicated lines or polling techniques. An illustrative embodiment is shown in FIG. 9.

Call distributors CD1–CDn are located at different geographic locations along with associated interface units IA1–IAn and IB1–IBn. Each of the interface units, as unit IA1 is coupled to an interface central processing unit 260 as indicated by lines 252, 254, 256 and 258. The interface CPU 260 may be located geographically proximate the interface units, for example in Omaha, to record and store the data relating to each caller, including the data provided by the caller and the data formulated by the computer in a data file 264 coupled thereto as indicated at line 266. Each of the lines may take the form of a dedicated telephone line or a polling telephonic coupling. The interface central processing unit 260 is coupled to a lottery central. processing unit 251 indicated at line 262 which may be located remote from the interface central processing unit 260 as for example in Indianapolis.

Figure 9:
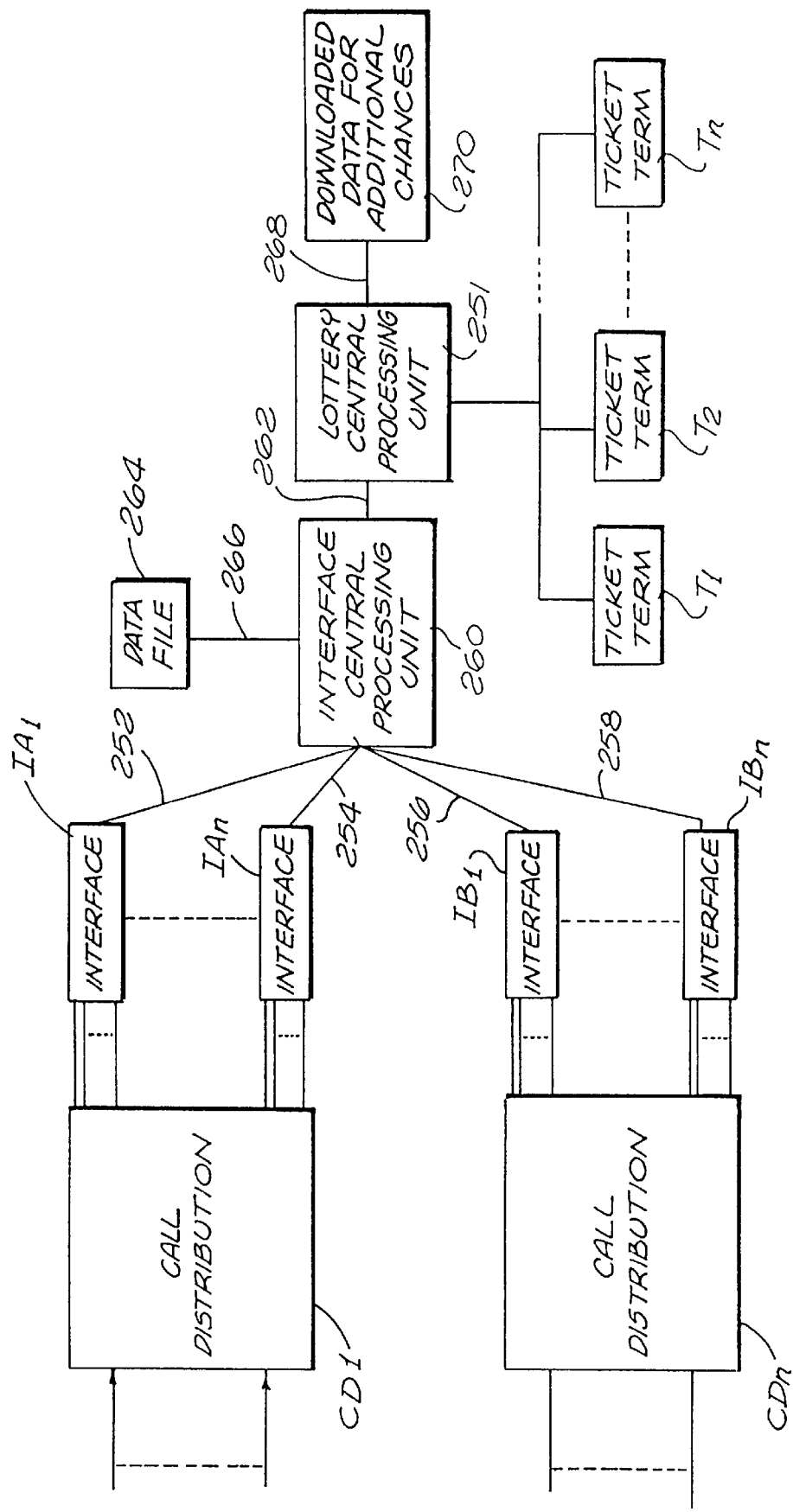
FIG. 9 is a block diagram of the connections between an interface CPU, a remote lottery CPU and remote stations.

In the operation of the system of FIG. 9, the call distributors CD are coupled to a telephonic communication system and accordingly allow the interface units I and the interface CPU 260 to provide interface communication between the lottery central processing unit 251 and a multitude of remote terminals T1–Tn. The interface central processing unit 260 stores complete data with regard to each caller in the data file 264. The interface central processing unit 260 may variously transmit or download important data only, for example the unique identification or ticket number and prize type (such as B) or prize amount ($50) stored in section 65 (FIG. 7) to the lottery central processing unit 251. Accumulated data with regard to a plurality of callers may be transmitted at a designated time to save on transmission time and cost. Downloaded data for the additional chances is also stored at a file 270. Thus, the distributed-component system is capable of executing the various formats as explained above with reference to the illustrative structure.

In view of the above explanation of exemplary systems, it will be appreciated that other embodiments of the present invention may be employed in many applications to accumulate statistical data, process such data, and define subsets of callers of concern. While certain exemplary operations have been stated herein, and certain detailed structures have been disclosed, the appropriate scope hereof is deemed to be in accordance with the claims as set forth below.

What is claimed is:

1. A ticket and ticket processor for use in combination with a touch tone telephone instrument of a telephone communication facility, whereby indications on said ticket are processed in accordance with one specific format of a plurality of formats, said ticket comprising:

a base substrate sized to accommodate specific indicia related to the use of the ticket;

visual format indicia on said base substrate visibly indicating said one specific format of a plurality of formats to be simultaneously processed by said telephonic-interface control system;

telephone number indicia on said base substrate for entry by touchtone telephone to provide signals indicative of called terminal digital data for identifying a called number for processing in accordance with said one specific format;

identification indicia on said base substrate indicating a unique identification number, said unique identification number containing information on said one specific format and for entry by said touchtone telephone instrument to provide signals indicative of said unique identification number for processing in accordance with said one specific format, and further for providing an indication that said unique identification number has reached a predetermined limit on use;

a concealing layer disposed on said base substrate for obscuring at least a portion of said unique identification number and removable to reveal said unique identification number; and said ticket processor comprising:

a processor for processing tickets in accordance with said plurality of formats including said one specific format and further to limit processing under control of said signals indicative of said unique identification number; and an interface unit to receive said signals indicative of called terminal digital data for controlling said process means to process in accordance with said one specific format.

2. A ticket according to claim 1, wherein said plurality of formats comprise lottery formats.

3. A ticket according to claim 1, wherein said unique identification number includes a stock number for tracking said ticket.

4. A ticket according to claim 1, wherein said telephone number indicia indicates a toll free number associated with said specific format for calling to attain processing of said unique identification number in accordance with said specific format.

5. A ticket according to claim 1, wherein said predetermined limit on use relates to a limited dollar value.

6. A ticket according to claim 5, wherein said predetermined limit on use is further limited to use for a defined interval of time.

7. A ticket according to claim 1, further including additional indicia on said base substrate, said additional indicia being co-related to said unique identification number.

8. A ticket and ticket processor according to claim 7, wherein said additional indicia is machine readable.

9. A ticket according to claim 8, wherein said machine readable additional indicia is a bar code.

10. A ticket according to claim 8, further including a second additional indicia, wherein at least one of said additional indicia and second additional indicia is a numerical indicia.

11. A ticket according to claim 1, further including at least two additional indicia on said base substrate, at least one of said additional indicia being machine readable and being co-related to said unique identification number.

12. A ticket according to claim 11, wherein at least one of said additional indicia is numeric indicia.

13. A ticket according to claim 1, wherein said one specific format qualifies a caller as belonging to an entitled set of persons.

14. A ticket according to claim 1, wherein said ticket processor is adapted to receive calling number identification signals and utilizes at least certain of said calling number identification signals to control at least certain operations of said one specific format.

* * * * *

UNITED STATES PATENT AND TRADEMARK OFFICE
CERTIFICATE OF CORRECTION

PATENT NO.    : 5,835,576
DATED         : November 10, 1998
INVENTOR(S)   : Ronald A. Katz It is certified that error appears in the above-identified patent and that said Letters Patent is hereby corrected as shown below:

Column 2,
Line 5, after "system" please delete ".".
Line 58, after "FIG. 4;" please delete "and".
Line 60, after "FIG. 4;" please insert the following:
-- and --

Column 4,
Line 18, please delete "accordance-herewith" and replace with the following:
-- accordance herewith --
Line 32, please delete "know" and replace with the following:
-- known --

Column 7,
Line 41, please delete "Adding without propagated carries:".
Line 45, before "6173" please insert the following:
-- Adding without propagated carries: --

Column 8,
Line 15, please delete "acknowledge" and replace with the following:
-- acknowledgement --

Column 9,
Line 42, please delete "Crontain" and replace with the following:
-- contain --

UNITED STATES PATENT AND TRADEMARK OFFICE
CERTIFICATE OF CORRECTION

PATENT NO.   : 5,835,576
DATED        : November 10, 1998
INVENTOR(S)  : Ronald A. Katz It is certified that error appears in the above-identified patent and that said Letters Patent is hereby corrected as shown below:

Column 12,
Line 53, after "central" please delete ".".

Signed and Sealed this

Tenth Day of September, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO. : 5,835,576
DATED : November 10, 1998
INVENTOR(S) : Ronald A. Katz

It is certified that error appears in the above-identified patent and that said Letters Patent is hereby corrected as shown below:

<u>Column 14,</u>
Lines 5-6, please delete "process means" and replace with the following -- processor --

Signed and Sealed this

Eighteenth Day of March, 2003

JAMES E. ROGAN
*Director of the United States Patent and Trademark Office*